(12) United States Patent
Huang et al.

(10) Patent No.: US 11,459,238 B2
(45) Date of Patent: Oct. 4, 2022

(54) METHODS AND COMPOSITIONS FOR TREATING THIEF ZONES IN CARBONATE FORMATIONS USING CROSSLINKED POLYMERIC SYSTEMS WITH GRAPHENE OXIDE JANUS NANOSHEETS CROSSLINKER

(71) Applicant: Saudi Arabian Oil Company, Dhahran (SA)

(72) Inventors: Jin Huang, Dhahran (SA); Feng Liang, Cypress, TX (US); Wengang Li, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 35 days.

(21) Appl. No.: 16/904,253

(22) Filed: Jun. 17, 2020

(65) Prior Publication Data
US 2021/0395093 A1     Dec. 23, 2021

(51) Int. Cl.
*C01B 32/182*  (2017.01)
*C01B 32/198*  (2017.01)
(Continued)

(52) U.S. Cl.
CPC .......... *C01B 32/182* (2017.08); *C01B 32/198* (2017.08); *C09K 8/426* (2013.01);
(Continued)

(58) Field of Classification Search
None
See application file for complete search history.

(56) References Cited

U.S. PATENT DOCUMENTS

| 7,552,771 B2 | 6/2009 | Eoff et al. |
| 9,228,940 B2 | 1/2016 | Pelletier et al. |
(Continued)

FOREIGN PATENT DOCUMENTS

| JP | 2020522452 A | 7/2020 |
| WO | 2017011328 A1 | 1/2017 |
| WO | 2019027817 A1 | 2/2019 |

OTHER PUBLICATIONS

Babaei, M. et al.; "Promising gene delivery system based on polyethylenimine-modified silica nanoparticles" Cancer Gene Therapy (2017) 00; pp. 1-9.
(Continued)

*Primary Examiner* — Jeffrey D Washville
(74) *Attorney, Agent, or Firm* — Bracewell LLP; Constance G. Rhebergen; Brian H. Tompkins

(57) ABSTRACT

A chemical gel system having a polymer and a graphene oxide Janus nanosheets crosslinker for treating thief zones in carbonate formations. The polymer and graphene oxide Janus nanosheets crosslinker may form a crosslinked polymer gel to reduce or prevent water production via thief zones during hydrocarbon production. The graphene oxide Janus nanosheets crosslinker includes a first side having negatively charged functional groups and a second side having amines. The negatively charged functional groups may include carboxyl groups, negatively charged oxygen groups, and hydroxyl groups. Methods of reducing water production in a thief zone using the graphene oxide Janus nanosheets crosslinker and methods of manufacturing the graphene oxide Janus nanosheets crosslinker are also provided.

7 Claims, 5 Drawing Sheets

(51) Int. Cl.
  *C09K 8/42* (2006.01)
  *C09K 8/467* (2006.01)
  *B82Y 35/00* (2011.01)
  *B82Y 40/00* (2011.01)
(52) U.S. Cl.
  CPC .............. *C09K 8/467* (2013.01); *B82Y 35/00* (2013.01); *B82Y 40/00* (2013.01); *C09K 2208/10* (2013.01)

(56) References Cited

U.S. PATENT DOCUMENTS

| | | |
|---|---|---|
| 9,484,079 B2 | 11/2016 | Lee |
| 9,708,525 B2 | 7/2017 | Suresh et al. |
| 9,708,896 B2 | 7/2017 | Suresh et al. |
| 9,784,079 B2 | 10/2017 | Salla et al. |
| 9,790,415 B1 | 10/2017 | Jiang et al. |
| 10,036,239 B2 | 7/2018 | Salla et al. |
| 10,053,613 B1 | 8/2018 | Kalgaonkar |
| 11,261,368 B2 | 3/2022 | Huang et al. |
| 2012/0015852 A1 | 1/2012 | Quintero et al. |
| 2012/0245058 A1 | 9/2012 | Monteiro et al. |
| 2014/0015896 A1 | 1/2014 | Katoh |
| 2017/0015896 A1 | 1/2017 | Cox et al. |
| 2017/0204718 A1 | 7/2017 | Pearl, Jr. et al. |
| 2017/0218250 A1 | 8/2017 | Boul et al. |
| 2018/0086971 A1 | 3/2018 | Al-Muntasheri et al. |
| 2018/0320053 A1 | 11/2018 | Kalgaonkar et al. |
| 2018/0327649 A1 | 11/2018 | Kalgaonkar |
| 2018/0327652 A1 | 11/2018 | Kuznetsov et al. |
| 2019/0010377 A1 | 1/2019 | Boul et al. |
| 2019/0010382 A1 | 1/2019 | Kuznetsov et al. |
| 2019/0016943 A1 | 1/2019 | Ren et al. |
| 2020/0377675 A1* | 12/2020 | Ren .................. C08J 3/215 |
| 2021/0107798 A1 | 4/2021 | Wang |

OTHER PUBLICATIONS

Buchman, Yekaterina Kapilov et al.; "Silica Nanoparticles and Polyethyleneimine (PEI)-Mediated Functionalization: A New Method of PEI Covalent Attachment for siRNA Delivery Applications" Bioconjugate Chem. Nov. 4, 2013; pp. 1-41.

Gao, Tao et al.; "Monodisperse Hollo Silica Nanospheres for Nano Insulation Materials: Synthesis, Characterization, and Life Cycle Assessment" ACS Appl. Mater. Interfaces 2013, 5; pp. 761-767.

Guo, Qian et al.; "Effects of Surface-Modified Alkyl Chain Length of Silica Fillers on the Rheological and Thermal Mechanical Properties of Underfill" IEEE Trans. on Components, Packaging & Man. Tech., vol. 6, No. 12, Dec. 2016; pp. 1796-1803.

Hummers, William S. et al.; "Preparation of Graphitic Oxide" JACS, Mar. 20, 1958, 80; p. 1339.

Liang, Feng et al.; "Reduced-Polymer-Loading, High-Temperature Fracturing Fluids by Use of Nanocrosslinkers" SPE 177469, Apr. 2017 SPE Journal; pp. 622-631.

Liang, Fuxin et al.; "Inorganic Janus Nanosheets" Agnew. Chem. Int. Ed. 2011, 50; pp. 2379-2382.

Liang, Fuxin et al.; "Janus hollow spheres by emulsion interfacial self-assembled sol-gel process" Chem. Commun., 2011, 47; pp. 1231-1233.

Luo, Dan et al.; "Nanofluid of graphene-based amphiphilic Janus nanosheets for tertiary or enhanced oil recovery: High performance at low concentration" PNAS Jul. 12, 2016, vol. 113, No. 28; pp. 7711-7716.

Luo, Dan et al.; "Secondary Oil Recovery Using Graphene-based Amphiphillic Janus Nanosheet Fluid at Ultralow Concentration" Industrial & Engineering Chemistry Research, 56 (39), 2017; pp. 11125-11132.

Sandberg, Linn Ingunn C. et al.; "Synthesis of Hollow Silica Nanospheres by Sacrificial Polystyrene Templates for Thermal Insulation Applications" Advances in Materials Science & Engineering vol. 2013, Art. ID 483651; pp. 1-6.

Sheng, Li et al.; "Janus Silica Hollow Spheres Prepared via Interfacial Biosilicification" American Chemical Society, Langmuir 2015, 31; pp. 11964-11970.

Wu, Hao et al.; "Janus graphene oxide nanosheets prepared via Pickering emulsion template" Carbon 93, 2015; pp. 473-483.

Yin, Taiheng et al.; "Physicochemical properties and potential applications of silica-based amphiphilic Janus nanosheets for enhanced oil recovery" Fuel 237 (2019); pp. 344-351.

Zhao, Xubo et al.; "Biocompatible graphene oxide as a folate receptor—targeting drug delivery system for the controlled release of anti-cancer drugs" Royal Soceity of Chemistry Adv., 2014, 4; pp. 24232-24239.

International Search Report and Written Opinion for International Application No. PCT/US2021/037888, report dated Sep. 22, 2021; pp. 1-16.

International Search Report and Written Opinion for International Application No. PCT/US2021/037897, report dated Sep. 21, 2021; pp. 1-15.

International Search Report and Written Opinion for International Application No. PCT/US2021/037908, report dated Sep. 16, 2021, pp. 1-15.

Luo, Dan et al.; "Synthesis of graphene-based amphiphilic Janus nanosheets via manipulation of hydrogen bonding" Carbon 126, 2018; pp. 105-110.

Zhao, Ziguang et al.; "Dually Responsive Janus Composite Nanosheets" Macromolecules, vol. 48, No. 11, ACS Publications, American Chemical Society, May 29, 2015; pp. 3598-3603.

U.S. Appl. No. 16/904,174, filed Jun. 17, 2020 and titled "Graphene Oxide Janus Nanosheets Relative Permeability Modifier (RPM) for Reducing Subterranean Formation Water Permeability in Carbonate Formations".

U.S. Appl. No. 16/904,211, filed Jun. 17, 2020 and titled "Silicon Dioxide Janus Nanosheets Relative Permeability Modifier (RPM) for Reducing Subterranean Formation Water Permeability in Carbonate and Sandstone Formations".

U.S. Appl. No. 16/904,275, filed Jun. 17, 2020 and titled "Methods and Compositions for Treating Thief Zones in Carbonate Formations Using Crosslinked Polymeric Systems with Silicon Dioxide Janus Nanosheets Crosslinker".

International Search Report and Written Opinion for International Application No. PCT/US2021/037900 report dated Sep. 21, 2021; pp. 1-13.

* cited by examiner

METHODS AND COMPOSITIONS FOR TREATING THIEF ZONES IN CARBONATE FORMATIONS USING CROSSLINKED POLYMERIC SYSTEMS WITH GRAPHENE OXIDE JANUS NANOSHEETS CROSSLINKER

BACKGROUND

Field of the Disclosure

The present disclosure generally relates to the production of hydrocarbons such as oil and gas from subterranean formations. More specifically, embodiments of the disclosure relate to sealing, plugging, or blocking thief zones in subterranean formations.

Description of the Related Art

The increase in maturing reservoirs in oil and gas production has increased the challenging of managing water production from subterranean formations. Certain levels of water production can detrimentally affect the economic life of hydrocarbon producing wells and can also cause other oilfield-related problems, such as scale deposition, fines migration, corrosion, etc. The water production can manifest as a variety of occurrences, such as water coning, water cresting, bottom water channeling at the wellbore, etc. Water production can also occur as a result of fluid communication between a water-producing zone and an oil- or gas-producing zone via fractures, high-permeability streaks, or fissures. The presence of thief zones (also referred to as "super-K" permeability zones or channels with relatively high absolute permeability) can also cause significant water production in hydrocarbon-producing zones.

SUMMARY

Different techniques have been developed to control water production. Such techniques include mechanical isolation, squeeze cementing, and different chemical treatments. Among these techniques, chemical gel systems have been widely used in field applications to suppress water production and improve oil recovery, especially in those environments in which that hydrocarbon-producing zones and water-producing zones cannot be isolated. Gel treatments have been used at injection wells to plug or seal water thief zones and improve sweep efficiency in reservoirs. In addition, such chemical gel treatments may reduce excess water production during hydrocarbon production.

However, the majority of commercially available chemical treatments, including gel treatments, are designed for sandstone formations and are not suitable for carbonate formations. The available chemical treatments are not designed to form chemical bonds to the carbonate rock surface under reservoir conditions. Consequently, there is a need for an improved chemicals and techniques for controlling water production and plugging, blocking, or sealing thief zones in carbonate reservoirs.

In one embodiment, a graphene oxide Janus nanosheet crosslinker for carbonate formations is provided. The graphene oxide Janus nanosheet crosslinker includes a graphene oxide nanosheet having a first side and a second side, and an alkyl group bonded to the first side, such that the alkyl group is selected from the group consisting of a C1-C8 alkyl. The graphene oxide Janus nanosheet crosslinker also includes a functional group bonded to the alkyl group, such that the functional group is selected from the group consisting of COOH, COO$^-$, OH, and O$^-$, and an amine bonded to the second side.

In some embodiments, the alkyl group is bonded to the first side by an oxygen atom. In some embodiments, the amine is bonded to the second side by a nitrogen atom. In some embodiments, the degree of amine functionality of the second side is in the range of 0.01 weight (wt) % to 50 wt %. In some embodiments, the graphene oxide nanosheet has a thickness in the range of 1 nanometer (nm) to 10 microns (μm). In some embodiments, the graphene oxide nanosheet has a lateral dimension in the range of 20 nanometers (nm) to 50 microns. In some embodiments, the alkyl group is a first alkyl group, and the graphene oxide Janus nanosheet crosslinker includes a second alkyl group bonded to the second side, such that the second alkyl group is selected from the group consisting of a C8-C30 alkyl. In some embodiments, the degree of hydrophobic alkyl functionality of the second side is in the range of 0.00 weight (wt) % to 20 wt %. In some embodiments, the amine is polyethylenimine.

In another embodiment, a method for reducing water production in a thief zone in a carbonate formation is provided. The method includes introducing a carrier fluid having a graphene oxide Janus nanosheet crosslinker and a polymer into the carbonate formation. The graphene oxide Janus nanosheet crosslinker includes a graphene oxide nanosheet having a first side and a second side, and an alkyl group bonded to the first side, such that the alkyl group is selected from the group consisting of a C1-C8 alkyl. The graphene oxide Janus nanosheet crosslinker also includes a functional group bonded to the alkyl group, such that the functional group is selected from the group consisting of COOH, COO$^-$, OH, and O$^-$, and an amine bonded to the second side.

In some embodiments, the alkyl group is bonded to the first side by an oxygen atom. In some embodiments, the amine is bonded to the second side by a nitrogen atom. In some embodiments, the degree of amine functionality of the second side is in the range of 0.01 weight (wt) % to 50 wt %. In some embodiments, the graphene oxide nanosheet has a thickness in the range of 1 nanometer (nm) to 10 microns (μm). In some embodiments, the graphene oxide nanosheet has a lateral dimension in the range of 20 nanometers (nm) to 50 microns. In some embodiments, the alkyl group is a first alkyl group, and the graphene oxide Janus nanosheet crosslinker includes a second alkyl group bonded to the second side, such that the second alkyl group is selected from the group consisting of a C8-C30 alkyl. In some embodiments, the degree of hydrophobic alkyl functionality of the second side is in the range of 0.00 weight (wt) % to 20 wt %. In some embodiments, the carrier fluid is a polar solvent. In some embodiments, the carrier fluid is water. In some embodiments, the polymer is a polyacrylamide. In some embodiments, the amine is polyethylenimine.

In another embodiment, a method of manufacturing a graphene oxide Janus nanosheet crosslinker is provided. The method includes obtaining a graphene oxide nanosheet having a first side and a second side and preparing a graphene oxide coated wax microsphere using the graphene oxide nanosheet, the graphene oxide coated wax microsphere having an exterior surface having the first side of the graphene oxide nanosheet. The method further includes functionalizing the exterior surface of the graphene oxide coated wax microsphere using a polyamine and dissolving the polyamine-functionalized graphene oxide coated wax microsphere to produce an intermediate graphene oxide nanosheet having the first side functionalized by the polyamine and the second side. Finally, the method includes converting one or more of the groups on the second side of the intermediate graphene oxide nanosheet using chloroacetic acid to produce a graphene oxide Janus nanosheet crosslinker. The graphene oxide Janus nanosheet crosslinker includes an alkyl group bonded to the first side, such that the alkyl group is selected from the group consisting of a C1-C8 alkyl. The graphene oxide Janus nanosheet crosslinker also includes a functional group bonded to the alkyl group, such that the functional group is selected from the group consisting of COOH, COO$^-$, OH, and O$^-$, and an amine bonded to the second side.

In some embodiments, the alkyl group is bonded to the first side by an oxygen atom. In some embodiments, the amine is bonded to the second side by a nitrogen atom. In some embodiments, the degree of amine functionality of the second side is in the range of 0.01 weight (wt) % to 50 wt %. In some embodiments, preparing a graphene oxide coated wax microsphere using the graphene oxide nanosheet includes emulsifying a mixture of graphene oxide nanosheet, deionized water, hydrochloric acid, and wax using a homogenizer and neutralizing the mixture with a base after emulsifying. In some embodiments, the polyamine is polyethylenimine. In some embodiments, dissolving the polyamine-functionalized graphene oxide coated wax microsphere to produce an intermediate graphene oxide nanosheet includes dissolving the polyamine-functionalized graphene oxide coated wax microsphere in chloroform. In some embodiments, converting one or more of the functional groups on the second side of the intermediate graphene oxide nanosheet using chloroacetic acid includes ultrasonicating an aqueous suspension of the intermediate graphene oxide nanosheet for a time period and mixing the aqueous suspension of the intermediate graphene oxide nanosheet with the chloroacetic acid and sodium hydroxide. In some embodiments, the alkyl group is a first alkyl group, such that the graphene oxide Janus nanosheet crosslinker includes a second alkyl group bonded to the second side, the second alkyl group selected from the group consisting of a C8-C30 alkyl.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a chemical gel system having a polymer and a graphene oxide Janus nanosheets crosslinker for treating thief zones in carbonate formations. The chemical gel system having a polymer and a graphene oxide Janus nanosheets crosslinker may plug, seal, or block thief zones in a carbonate formation and may reduce or prevent water production via such thief zones during hydrocarbon production. In some embodiments, the polymer is an acrylamide-based polymer. The graphene oxide Janus nanosheet crosslinker includes a crosslinker side having amines and an anionic side having negatively charged functional groups. In some embodiments, the amine is polyethylenimine (PEI). The negatively charged groups may include carboxyl groups (COOH), negatively charged oxygen groups (O$^-$), and hydroxyl (OH) groups.

The graphene oxide Janus nanosheet crosslinker and a polymer may be introduced into thief zone in a carbonate formation such that the anionic side attaches to the rock surface of pores of the carbonate formation via an anionic bond between the negatively charged groups and the positively charged calcium ions (Ca$^{2+}$) on the rock surface. The crosslinker side of the graphene oxide Janus nanosheets crosslinker faces the pore space. The crosslinker side of the graphene oxide Janus nanosheets crosslinker provides crosslinking sites for the polymer to enable formation of a polymer gel in the pore space. The crosslinked polymer gel may plug, seal, or block the pores or other openings in the thief zone and reduce or prevent water production via the thief zone.

The graphene oxide Janus nanosheet crosslinker may be synthesized from a graphene oxide nanosheet obtained commercially or from graphite powder via known processes. The hydrophobic side of the graphene oxide Janus nanosheet crosslinker may be prepared by producing graphene oxide coated wax microspheres from the graphene oxide nanosheet and functionalizing the exterior surface of the graphene oxide coated wax microsphere using an amine (for example, polyethylenimine (PEI)). The opposite side of the graphene oxide Janus nanosheets crosslinker may be prepared by converting some of the hydroxyl and negatively charged oxygen groups to carboxyl groups using a chloroalkyl carboxylic acid such as chloroacetic acid (ClCH$_2$COOH).

Structure of Graphene Oxide Janus Nanosheets Crosslinker

Figure 1:
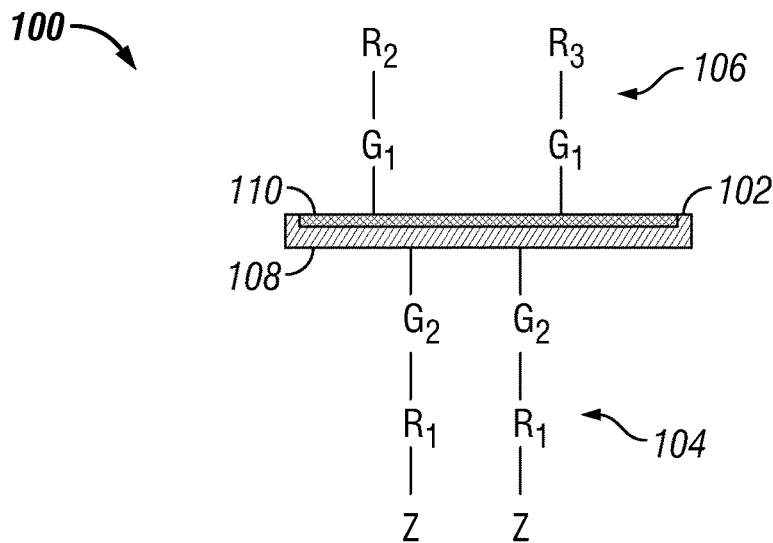
FIG. 1 shows the chemical structure of a graphene oxide Janus nanosheets crosslinker in accordance with an embodiment of the disclosure.

FIG. 1 is shows the structure of a graphene oxide Janus nanosheet crosslinker 100 in accordance with an embodiment of the disclosure. As discussed in the disclosure the graphene oxide Janus nanosheets crosslinker may enable the crosslinking of a suitable polymer (for example, a polyacrylamide-based polymer) in thief zones in a carbonate formation.

As shown in FIG. 1, the graphene oxide Janus nanosheet 100 includes a graphene oxide nanosheet 102 having a first side 104 (referred to as the "anionic" side) that includes negatively charged functional groups and a second and opposite side 106 (referred to as the "crosslinking" side) having one or more amines (that is, molecules containing a basic nitrogen atom with a lone pair of electrons). As used in the disclosure, term "negatively charged groups" may include groups that ionize by releasing a hydrogen (H) atom as a free proton. As discussed infra, the first side 104 that includes negatively charged groups enables the graphene oxide Janus nanosheet 100 to attach to the rock surface of a carbonate formation via interaction with calcium ions ($Ca^{2+}$) present on the carbonate rock surface. The second side 106 having an amine acts as a crosslinker with a polymer introduced into the carbonate formation to enable formation of a crosslinked polymer gel.

As first shown in FIG. 1, the first side 104 includes groups $G_2$ bonded to a surface 108 of the graphene oxide nanosheet 102, groups $R_1$ bonded to groups $G_2$, and groups Z bonded to groups $G_2$. $G_2$ is an oxygen atom (O). $R_1$ is selected from the group consisting of C1 to C8 alkyls (that is an alkyl group having a number of carbon atoms in the range of 1 to 8). Z is selected from the group consisting of carboxyl ($COOH$ and $COO^-$), hydroxyl (OH), and negatively charged oxygen groups ($O^-$).

The second side 106 includes groups $G_1$ bonded to the opposite surface 110 of the graphene oxide nanosheet 102, groups $R_2$ bonded to groups $G_1$, and groups $R_3$ bonded to groups $G_2$. $G_1$ is a nitrogen atom (N). $R_2$ is an amine. $R_3$ is selected from the group consisting of C8 to C30 alkyls (that is an alkyl group having a number of carbon atoms in the range of 8 to 30). In some embodiments, $R_2$ is polyethylenimine (PEI). In some embodiments, the degree of PEI functionality provided by the $R_2$ groups is in the range of 0.01 weight (wt) % to 50 wt %. The degree of hydrophobic alkyl chain functionality provided by the $R_3$ groups may be in the range of 0.0 weight (wt) % to 20 wt %.

Process for Graphene Oxide Janus Nanosheets Crosslinker

Figure 2:
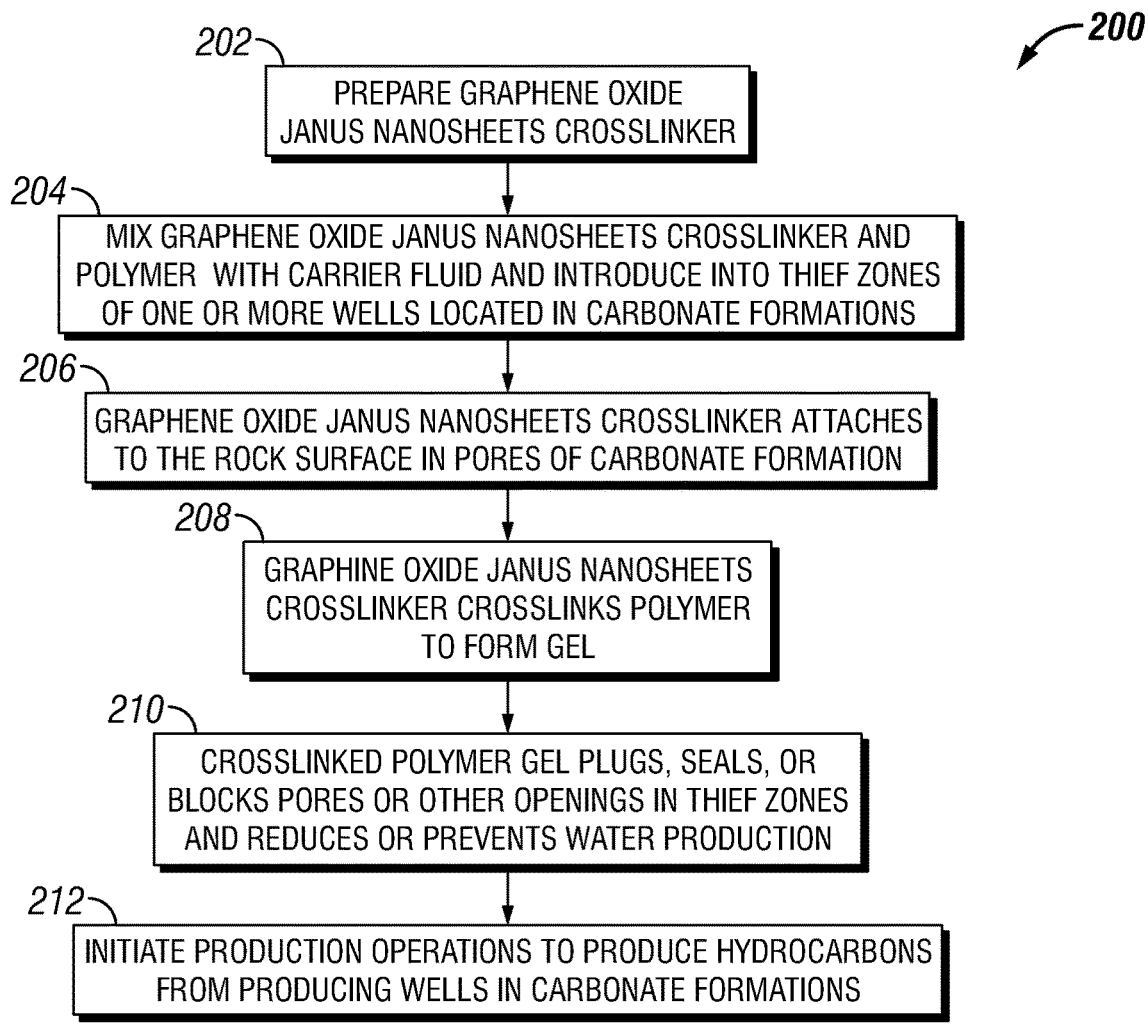
FIG. 2 is a block diagram of a process for using a graphene oxide Janus nanosheets crosslinker in accordance with an embodiment of the disclosure.

FIG. 2 depicts a process 200 for using a chemical gel system of a polymer and a graphene oxide Janus nanosheets crosslinker in accordance with an embodiment of the disclosure. Initially, a graphene oxide Janus nanosheets crosslinker may be prepared (block 202). The graphene oxide Janus nanosheets crosslinker may be prepared at a wellsite or, in some embodiments, prepared offsite and then transported to the wellsite. In some embodiments, a polymer and the graphene oxide Janus nanosheets crosslinker may be mixed with a carrier fluid and introduced into thief zones in one or more wells located in carbonate formations (block 204). The carrier fluid may be a polar solvent (for example, water). The one or more wells may include producing wells, injection wells, or a combination thereof. In other embodiments, the graphene oxide Janus nanosheets crosslinker and polymer may be introduced into a well separately. In such embodiments, the graphene oxide Janus nanosheets crosslinker may be may be mixed with a first carrier fluid and introduced into one or more wells located in carbonate formations. The first carrier fluid may be water, a water-based fluid, or a polar solvent. The polymer may then be mixed with a second carrier fluid and introduced into the one or more wells after the introduction of the graphene oxide Janus nanosheets crosslinker. The second carrier fluid may be water or a water-based fluid.

After injection, the graphene oxide Janus nanosheets crosslinker may attach to the rock surface in pores and other openings in the carbonate formation (block 206) due to the ionic interaction between the negatively charged side of the graphene oxide Janus nanosheets and the positively charged calcium ions ($Ca^{2+}$) on the rock surface, such that the crosslinking side of the graphene oxide Janus nanosheets is oriented outward away from the rock surface (for example, toward the pore space of a pore in the rock). The graphene oxide Janus nanosheets crosslinker crosslinks with the polymer to form a crosslinked polymer gel in the openings (block 208). The amines on the crosslinking side of the graphene oxide Janus nanosheets crosslinker provide crosslinking sites for the polymer. For example, in some embodiments, an acrylamide-based polymer (such as polyacrylamide (PAM)) may crosslink with the amines via a transamidation reaction. The crosslinked polymer gel may plug, seal, or block the pores or other openings in the thief zones and reduce or prevent water production via the thief zones (block 210).

Next, production operations may be initiated (block 212) to produce hydrocarbons from producing wells with reduced water production from the thief zones in the one or more wells having the chemical gel system of a polymer and a graphene oxide Janus nanosheets crosslinker. As will be appreciated, the crosslinked polymer gel may remain in the thief zones without much mobilization due to the bond between the anionic side of the graphene oxide Janus nanosheets crosslinker and the carbonate rock surface, thus ensuring the water production remains reduced during production.

Figure 3:
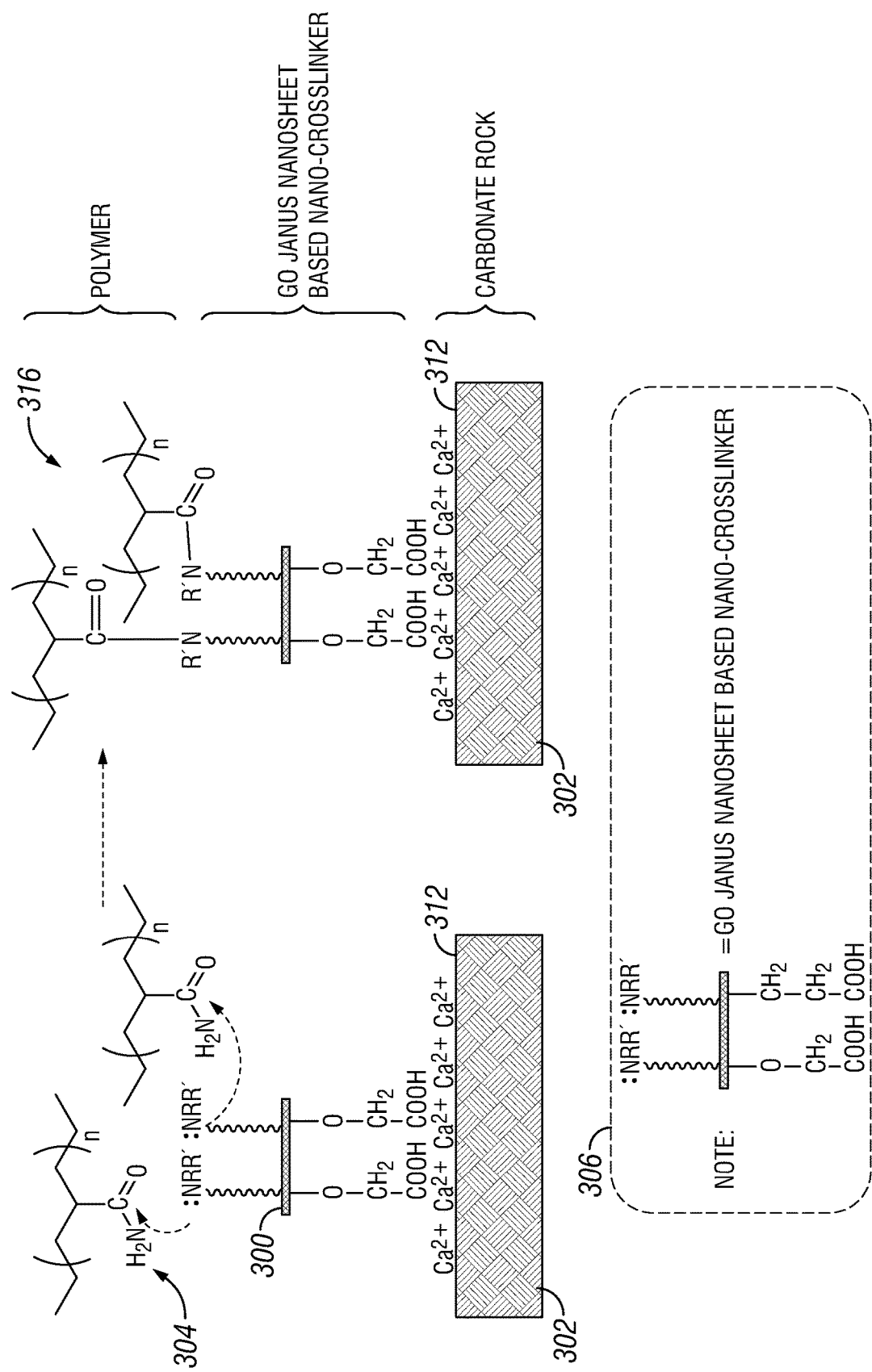
FIG. 3 is a schematic diagram depicting the mechanism of a graphene oxide Janus nanosheets crosslinker in a carbonate formation in accordance with an embodiment of the disclosure.

FIG. 3 depicts the mechanism of a graphene oxide Janus crosslinker 300 in carbonate rock 302 in accordance with an embodiment of the disclosure. The carbonate rock 302 may be located in a thief zone in the formation that produces water in a well. As described in the disclosure, the graphene oxide Janus nanosheets crosslinker 300 may provide for the formation of a crosslinked polymer gel attached to the carbonate rock 302 to reduce or prevent water production in a thief zone.

As shown in inset 306 in FIG. 3, the graphene oxide Janus nanosheets crosslinker 300 includes a first side 308 having negatively charged groups (by way of example, only carboxyl groups are shown in FIG. 3) and a second (crosslinking) opposite side 310 having amines. As shown in FIG. 3, the first side 308 interacts with the calcium ions ($Ca^{2+}$) on the surface 312 of the carbonate rock 302 to attach the first side 308 of the graphene oxide Janus nanosheets crosslinker 300 to the carbonate rock 302. After attaching the graphene oxide Janus nanosheets crosslinker 300 to the carbonate rock 302, the second side 310 of the graphene oxide Janus nanosheets crosslinker 300 is oriented outward from the surface 312, such as toward a pore space of a pore.

The second side 310 of the graphene oxide Janus nanosheets crosslinker 300 provides a crosslinking site for a polymer 304. As illustrated in FIG. 3, for example, the amide group 314 of the polymer 304 may react with the amine of the second side 310 of the graphene oxide Janus nanosheets crosslinker 300 via a transamidation reaction. FIG. 3 also depicts the resulting crosslinked polymer 316 bonded to the second side 310 of the graphene oxide Janus nanosheets crosslinker 300. The crosslinked polymer 316 may form a gel that reduces or prevents the flow of water via pores or other openings in the carbonate rock 302.

Synthesis of Graphene Oxide Janus Nanosheet Crosslinker

Figure 4:
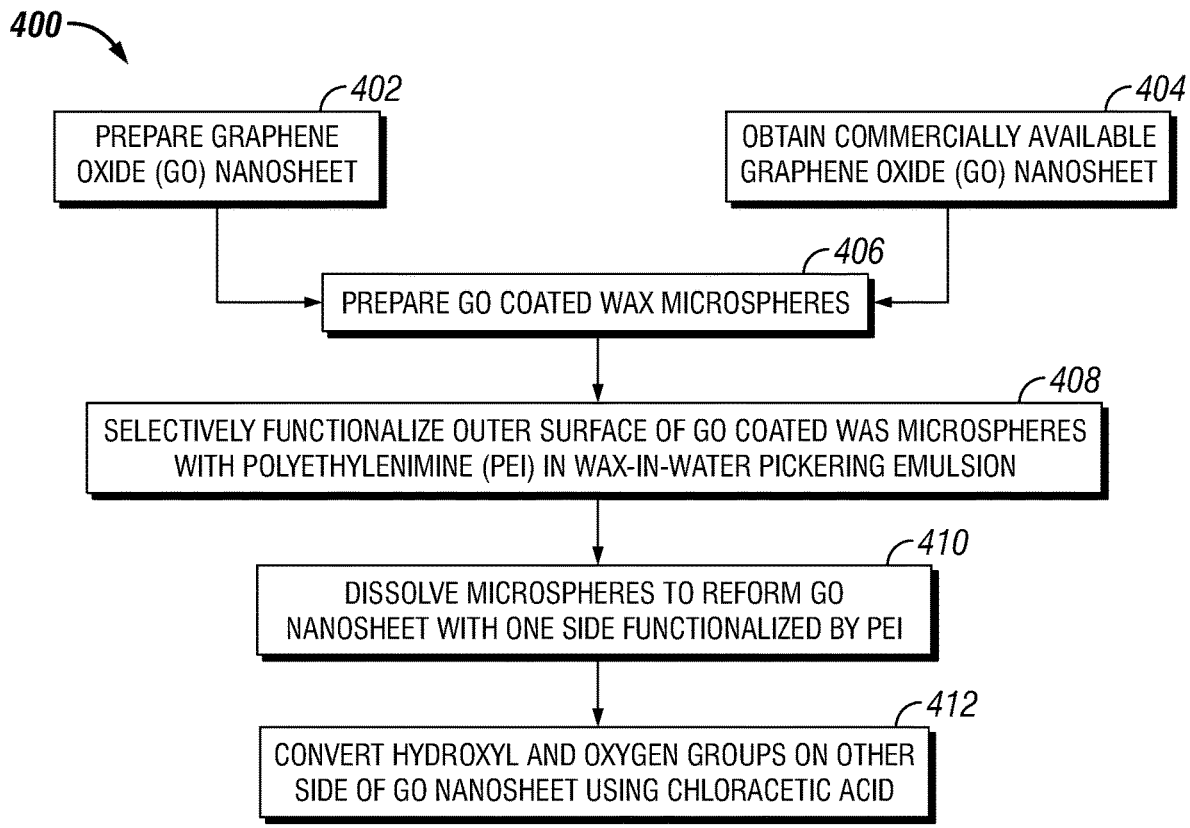
FIG. 4 a block diagram of a process for the synthesis of a graphene oxide nanosheet crosslinker in accordance with an embodiment of the disclosure.
Figure 5:
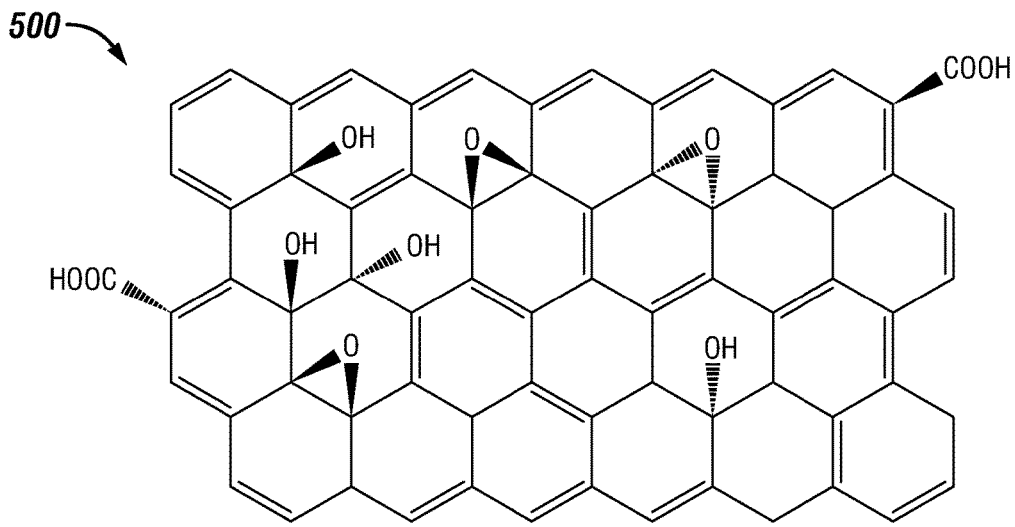
FIG. 5 depicts the chemical structure of an example single layer graphene oxide nanosheet produced according to an embodiment of the disclosure.

FIG. 4 depicts a process 400 for the synthesis of a graphene oxide nanosheet crosslinker in accordance with an embodiment of the disclosure. As will be appreciated, in some embodiments, a graphene oxide nanosheet may be prepared from graphite powder (block 402) using known techniques. In such embodiments, a graphite power may be converted to graphite via a strong oxidizing agent (SOA). For example, the strong oxidizing agent may be potassium manganate ($KMnO_4$) in sulfuric acid ($H_2SO_4$) and may include sodium nitrate ($NaNO_3$) in the mixture. Next, the graphene oxide may be exfoliated in water using ultrasonication (that is, sonication using ultrasonic waves) to produce graphene oxide having a single layer thickness or a thickness of in the range or two to four layers. FIG. 5 depicts an example single layer graphene oxide nanosheet 500 produced via this technique. As shown in FIG. 5, the graphene oxide nanosheet 500 includes functional groups such as carboxyl (COOH), epoxide (O), and hydroxyl ($OH^-$). The carboxyl groups may be present in protonated (COOH) and deprotonated ($COO^-$) forms (not shown).

In other embodiments, a commercially available graphene oxide nanosheet may be obtained (block 404). A "graphene oxide nanosheet" as used herein may include or refer to a bundle of graphene oxide nanosheets. In some embodiments, the graphene oxide nanosheet may be obtained from Techinstro of Nagpu, Maharashtra, India. By way of example, the graphene oxide nanosheet obtained from Techinstro of Nagpu, Maharashtra, India has a composition of 70.5% C, 23% O, 0.4% S, 1.2% H, and 4.9% N, a lateral dimension in the range of 20 nanometers (nm) to 50 microns, and a thickness in the range of 1 nanometer (nm) to 10 microns ($\mu$m).

Next, graphene oxide coated wax microspheres may be prepared from the graphene oxide nanosheets (block 406). For example, the graphene oxide nanosheets, deionized water, and hydrochloric acid may be sonicated for about 5 minutes. Wax may be added to the mixture, and the mixture may be heated until the wax is melted (for example, to a temperature of at least 60° C.). In some embodiments, the wax may have a melting point of about 55° C. The mixture may then be emulsified using a homogenizer. In some embodiments, the homogenizer may be an FJ400-S homogenizer available from Zhejiang L&B Fluid Equipment LTD. Of Zhejiang, China. After emulsification, GO coated wax microspheres may be obtained by filtering the mixture and neutralizing the resulting product with a base (for example, sodium hydroxide (NaOH).

Next, the exterior surface of the graphene oxide coated wax microspheres may be functionalized with an amine (for example, a polyamine) using a wax-in-water Pickering emulsion (block 408). The functionalization may be performed by reacting the polyamine with epoxide groups on the exterior surface of the graphene oxide coated wax microspheres, such that polyamine is bonded to the graphene oxide nanosheet via a nitrogen atom. In some embodiments, the amine may be a polyamine polymer. In some embodiments, the polyamine polymer is PEI.

Next, the polyamine-functionalized graphene oxide coated wax microspheres may be dissolved (block 410) to produce graphene oxide nanosheets having one side that includes amines (produced by the polyamine functionalization) and the other side having the groups of the nanosheet (that is, carboxyl (COOH), epoxide (O), and hydroxyl ($OH^-$). In some embodiments, the polyamine-functionalized graphene oxide coated wax microspheres may be dissolved using chloroform.

Figure 6:
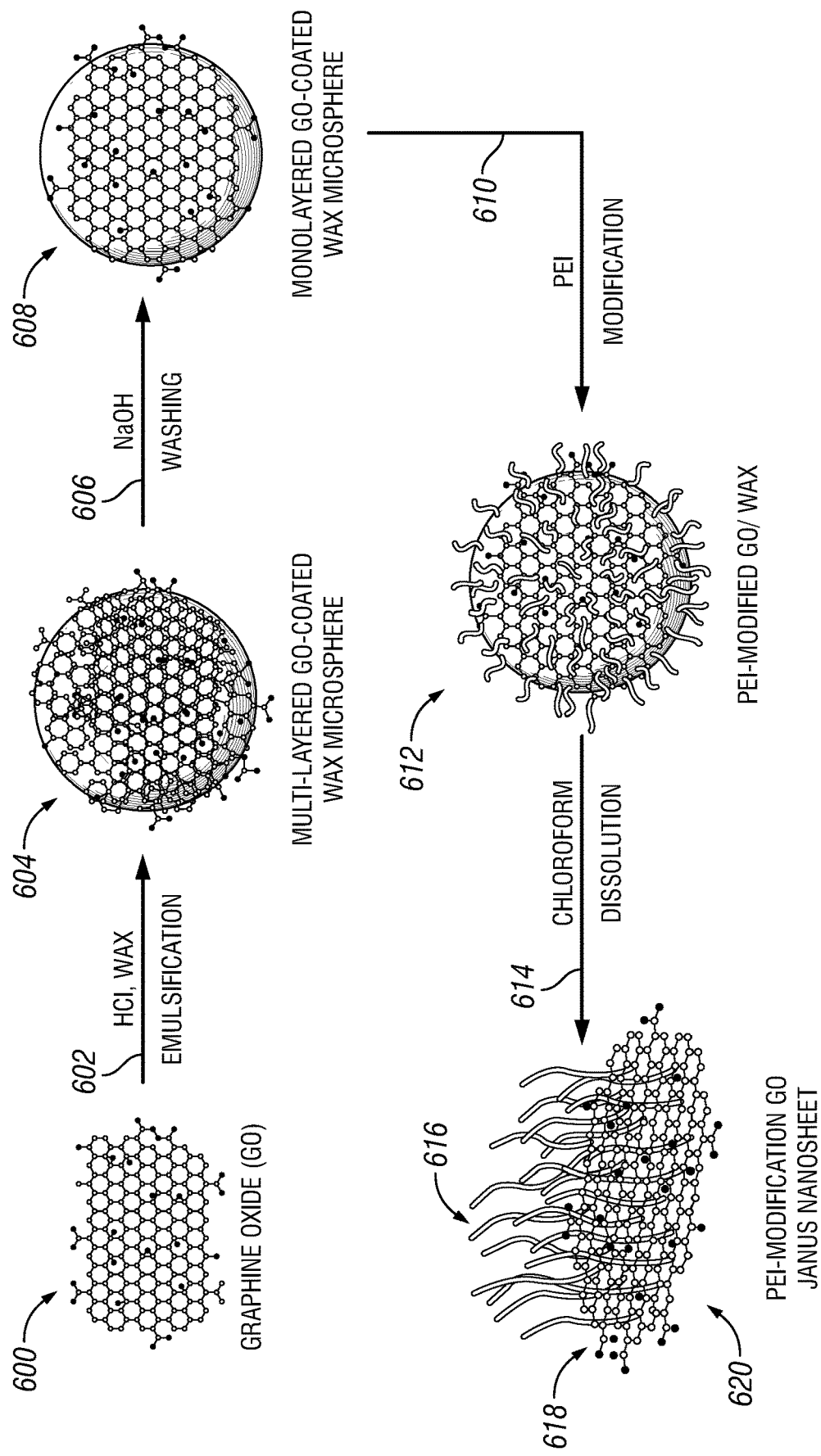
FIG. 6 shows a chemical reaction scheme for preparing and functionalizing graphene oxide coated wax microspheres to produce polyethylenimine (PEI)-functionalized graphene oxide nanosheets in accordance with an embodiment of the disclosure.

FIG. 6 illustrates steps 406 and 408 of process 400 in accordance with an embodiment of the disclosure. Initially, graphene oxide nanosheets 600 are mixed with hydrochloric acid (HCl), deionized water, and wax, and the mixture is emulsified (arrow 602). The resulting products are multiplayer graphene oxide coated wax microspheres 604. As shown in FIG. 6, the multiplayer graphene oxide coated wax microspheres 604 may be filtered washed with a base such as sodium hydroxide (NaOH) (arrow 606). The resulting products are single layer graphene oxide coated wax microspheres 608, such one layer of the graphene oxide nanosheets forms the exterior surface of the wax microspheres and is available for the functionalization described in the process 400.

As shown in FIG. 6, the single layer graphene oxide coated wax microspheres 606 may be functionalized with a polyamine polymer such as PEI (arrow 610). The resulting product is polyamine-functionalized graphene oxide coated wax microspheres 612 having amines on the exterior surface. The polyamine-functionalized graphene oxide coated wax microspheres may then be dissolved using chloroform (arrow 614) to produce polyamine-functionalized graphene oxide nanosheets 616 having one side 618 that includes amines and an opposite side 620 having groups from the original nanosheet (shown in FIG. 5).

The other side of the graphene oxide nanosheets may be functionalized using a chloro-alkyl carboxylic acid to produce a graphene oxide Janus nanosheets crosslinker as described in the disclosure. As shown in FIG. 4, some of the hydroxyl and epoxide groups on the non-alkylamine functionalized side of the graphene oxide nanosheets may be converted to carboxyl groups using a chloro-alkyl carboxylic acid (Cl-alkyl-COOH) (block 412) to produce the graphene oxide Janus nanosheets crosslinker. The carboxyl groups may include protonated (COOH) and deprotonated ($COO^-$) groups (also referred to as carboxylate groups). Additionally, some of the hydroxyl groups are converted to negatively charged oxygen ($O^-$) groups.

The hydroxyl groups of the graphene oxide nanosheet may be converted to an oxygen atom, such that the alkyl group from the chloro-alkyl carboxylic acid is bonded to the graphene oxide nanosheet via an oxygen atom (including oxygen atoms from the epoxide groups) and the carboxyl group from the chloro-alkyl carboxylic acid is bonded to the alkyl. In some embodiments, the chloro-alkyl carboxylic acid may be chloroacetic acid ($ClCH_2COOH$). In such embodiments, the alkyl group bonded to the oxygen atom is methyl ($CH_2$). The reaction with the hydroxyl groups on the polyamine-functionalized side (that is, the side having alkyl groups) of the graphene oxide nanosheet may be minimized by steric effects.

In some embodiments, for example, an aqueous suspension of the polyamine-functionalized graphene oxide nanosheets may be mixed with sodium hydroxide (NaOH) and chloroacetic acid ($ClCH_2COOH$), and the mixture may be ultrasonicated to convert the hydroxyl and negatively charged oxygen groups to carboxyl groups. In some embodiments, the mixture may be ultrasonicated for at least 3 hours. In some embodiments, the aqueous suspension of the polyamine-functionalized graphene oxide nanosheets may be ultrasonicated before mixing with the sodium hydroxide (NaOH) and chloroacetic acid ($ClCH_2COOH$) to obtain a clear suspension. In some embodiments, the mixture may include equal amounts by mass of sodium hydroxide (NaOH) and chloroacetic acid ($ClCH_2COOH$). After ultrasonication, the suspension having the graphene oxide Janus nanosheets crosslinker may be neutralized and purified via rinsing and filtration. The suspension may then be dialyzed against distilled water to remove ions and dried in a vacuum at a temperature of at least 65° C.

Figure 7:
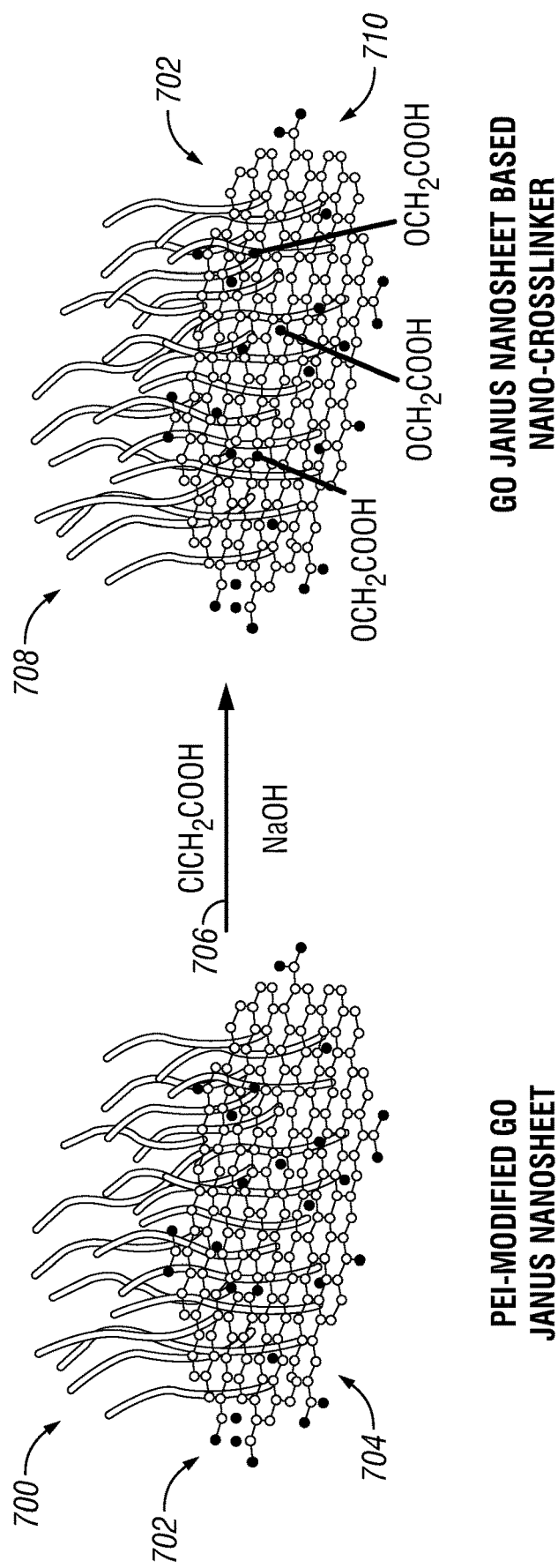
FIG. 7 shows a chemical reaction scheme for functionalizing a side of a PEI-functionalized graphene oxide nanosheet using chloroacetic acid in accordance with an embodiment of the disclosure.

FIG. 7 illustrates steps 412 of the process 400 in accordance with an example embodiment of the disclosure. Polyamine-functionalized graphene oxide nanosheets 700 having one side 702 functionalized with a polyamine and a non-functionalized opposite side 704 are functionalized using chloroacetic acid (ClCH$_2$COOH) in a mixture that also includes sodium hydroxide (NaOH) (arrow 706). The resulting product is a graphene oxide Janus nanosheets crosslinker 708 having one (crosslinking) side 702 having amines and the opposite side 710 having carboxylate groups converted from the hydroxide and negatively charged oxygen groups of the graphene oxide nanosheets.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A graphene oxide Janus nanosheet crosslinker for carbonate formations, consisting essentially of:
   a graphene oxide nanosheet having a first side and a second side,
   an alkyl group bonded to the first side, the alkyl group selected from the group consisting of a C1-C8 alkyl, wherein the alkyl group is bonded to the first side by an oxygen atom;
   a functional group bonded to the alkyl group, the functional group selected from the group consisting of COOH, COO$^-$, OH, and O$^-$, wherein the amine is bonded to the second side by a nitrogen atom; and
   an amine bonded to the second side.

2. The graphene oxide Janus nanosheet crosslinker of claim 1, wherein the degree of amine functionality of the second side is in the range of 0.01 weight (wt) % to 50 wt %.

3. The graphene oxide Janus nanosheet crosslinker of claim 1, wherein the graphene oxide nanosheet has a thickness in the range of 1 nanometer (nm) to 10 microns (μm).

4. The graphene oxide Janus nanosheet crosslinker of claim 1, wherein the graphene oxide nanosheet has a lateral dimension in the range of 20 nanometers (nm) to 50 microns.

5. The graphene oxide Janus nanosheet crosslinker of claim 1, wherein the alkyl group comprises a first alkyl group, the graphene oxide Janus nanosheet crosslinker comprising a second alkyl group bonded to the second side, wherein the second alkyl group is selected from the group consisting of a C8-C30 alkyl.

6. The graphene oxide Janus nanosheet crosslinker of claim 1, wherein the degree of hydrophobic alkyl functionality of the second side is in the range of 0.00 weight (wt) % to 20 wt %.

7. The graphene oxide Janus nanosheet crosslinker of claim 1, wherein the amine comprises polyethylenimine.

\* \* \* \* \*